United States Patent [19]

Jansson et al.

[11] 4,135,853

[45] Jan. 23, 1979

[54] STAY RING FOR THE SPIRAL CASING OF A ROTARY HYDRAULIC MACHINE

[75] Inventors: Eric O. Jansson; Bengt O. Nauclér; Thomas Åsberg, all of Kristinehamn, Sweden

[73] Assignee: Aktiebolaget Karlstads Mekaniska Werkstad, Kristinehamn, Sweden

[21] Appl. No.: 782,168

[22] Filed: Mar. 28, 1977

[30] Foreign Application Priority Data

Mar. 30, 1976 [SE] Sweden .............................. 76037894

[51] Int. Cl.² ............................................ F01D 25/24
[52] U.S. Cl. ................................ 415/204; 415/219 C; 415/500; 29/156.4 R
[58] Field of Search ............................ 415/203–205, 415/184, 217, 219 A, 219 B, 219 C, 500; 228/178, 182; 29/156.4 R

[56] References Cited

U.S. PATENT DOCUMENTS

| | | | |
|---|---|---|---|
| 1,762,121 | 6/1930 | Gross | 415/217 |
| 2,996,995 | 8/1961 | Culaud | 415/500 |
| 3,406,945 | 10/1968 | Jenkinson | 415/219 C |

FOREIGN PATENT DOCUMENTS

| | | | |
|---|---|---|---|
| 171580 | 12/1951 | Austria | 415/219 C |
| 188287 | 1/1957 | Austria | 415/219 C |
| 46-41966 | 12/1971 | Japan | 415/219 C |
| 1066510 | 9/1957 | Fed. Rep. of Germany | 415/219 R |
| 1066149 | 4/1959 | Fed. Rep. of Germany | 415/219 R |
| 1258360 | 1/1968 | Fed. Rep. of Germany | 415/219 R |
| 1258360 | 1/1968 | Fed. Rep. of Germany | 415/205 |
| 1804584 | 7/1969 | Fed. Rep. of Germany | 415/500 |
| 221458 | 7/1967 | Sweden | 415/219 R |
| 361770 | 6/1962 | Switzerland | 415/219 C |

Primary Examiner—C. J. Husar
Attorney, Agent, or Firm—Brumbaugh, Graves, Donohue & Raymond

[57] ABSTRACT

A stay vane ring for the spiral casing of a rotary hydraulic machine comprises two axially spaced-apart ring members disposed coaxially about the machine axis and a plurality of axially extending stay vanes connected between the ring members. Each ring member is a cast member having a substantially triangular cross section and is disposed with one wall facing the other ring member, the axial ends of the stay vanes being welded to those walls and the ends of metal plates making up the spiral casing being welded to the ring members along annular edges thereof that are located opposite the aforementioned walls.

5 Claims, 3 Drawing Figures

STAY RING FOR THE SPIRAL CASING OF A ROTARY HYDRAULIC MACHINE

BACKGROUND OF THE INVENTION

This invention relates to stay rings (also called speed rings) for the spiral casings of rotary hydraulic machines, such as hydraulic turbines, pump turbines and pumps.

Such stay rings are subjected to considerable forces originating, primarily, from the internal hydrostatic pressure acting on the walls of the spiral casing that is joined to the stay ring and, to a lesser extent, from the pressure within the stay ring itself and from the guide vane ring and/or the turbine cover which are connected to the stay ring. The forces due to loads imposed on the stay ring can be resolved, for purposes of analysis, into radial components perpendicular to the axis of the machine and axial components. The radial components produce internal circumferential tensile stresses in each of the two ring members of the stay ring, whereas the axial components produce internal axial tensile stresses in the stay vanes. It is important that the internal stresses in the various parts of the stay ring be distributed as uniformly as possible over the cross sections of these parts, in order to achieve an optimal utilization of the material and thereby reduce the dimensions of the parts and obtain substantial economical advantages as to the costs for the material and also the transport of the stay ring from the factory to the site of installation. In this connection, it should be noted that a reduction of the radial width of the stay ring results in a corresponding reduction of the total dimensions of the spiral casing located radially outside of the stay ring, which is also advantageous with respect to costs, weight and transport.

Inasmuch as all forces acting upon the stay ring are initially imposed upon the two ring members of the stay ring, it is essential that the ring members and the connections between, in particular, the walls of the spiral casing and the ring members be of such a design that the ring members can absorb such forces without any substantial bending, twisting or other distortion and also transfer the axial components of such forces to the stay vanes as uniformly distributed as possible over the cross sections of the stay vanes.

With the foregoing objectives, stay rings of a welded construction have been suggested in the prior art (for instance in German Pat. Nos. 1,066,149 and 1,258,360 and Swedish Pat. No. 221,458). In the designs of such welded stay rings, one objective has been to direct the forces from the spiral casing through the center of gravity of the cross section of the ring members and, in turn, to make the axial force components of all external forces acting upon the ring members coincide as much as possible with the axes of the stay vanes. However, these known, so-called "balanced" stay rings of welded construction have several serious disadvantages. For example, in some known stay rings the ring members include metal plates which are subjected to very large tensile stresses in a direction perpendicular to the plane of the plates. It is well known that rolled metal plate inherently has a somewhat laminated structure parallel to its plane, wherefore there is a considerable risk of delamination of a metal plate when it is subjected to tensile stresses perpendicular to its plane. Moreover, there are often considerable stress concentrations at certain locations in many known stay rings. Also, in many of the prior art structures the ring members have an unsatisfactory rigidity or stiffness and are subject to bending and twisting or are of a comparatively complicated design, thus necessitating large amounts of welding, which is time consuming and expensive. In many cases, large parts of the welds are located in places that are not readily accessible, wherefore it is difficult to make the welds and to check their quality in a satisfactory way.

SUMMARY OF THE INVENTION

An object of the present invention, therefore, is to provide a stay vane ring which fulfills the desired requirements and conditions in a more satisfactory manner than known stay rings.

According to the invention, that object is achieved with a stay ring comprising two axially spaced-apart ring members, each of which is welded to the respective ends of the plates making up the spiral casing and is disposed coaxially with the axis of the machine, and a multiplicity of axially extending stay vanes connected between the ring members by welds. Each of the ring members is a cast member having a substantially triangular cross section disposed with one wall facing the other ring member. The edges of the plates of said spiral casing are welded to the ring members along the annular edges of the ring members opposite the aforementioned wall.

The amount of welding involved in making the stay ring is reduced considerably from that required in making known stay rings, and the welds present are located such that they are relatively easy to make and to check for quality. The triangular cross-sectional shape of the cast ring members makes it possible to obtain high bending stiffness with a comparatively small amount of material, which reduces the costs for material, the weight and the dimensions. Through the combination of the cross-sectional form of the cast ring members and the manner of connection of the metal plates of the spiral casing to the ring members, the ring members transfer the forces from the spiral casing to the stay vanes with a very uniform distribution over the entire cross sections of the stay vanes. This makes it possible to reduce the cross-sectional areas of the stay vanes, which further reduces the material costs, the weight and also the radial width of the stay ring. Further, the stay ring according to the invention does not have any plate members which are subjected to tensile stresses perpendicular to the plane of the plate.

The shape in cross section of each of the ring members of the stay ring is, preferably, such that extensions in radial-axial planes of the axes of the ends of the spiral casing plates pass in close proximity to the centers of gravity of the cross sections of the ring members in said planes. Moreover, the diameter of the edge of each ring member to which the spiral casing plates are attached should ordinarily have a diameter intermediate the diameters of the remaining two edges of the ring member at the two remaining vertexes of the cross section.

The invention is further described below with reference being made to the accompanying drawings, which show some embodiments of the invention by way of example.

DESCRIPTION OF EMBODIMENTS

Figure 1:
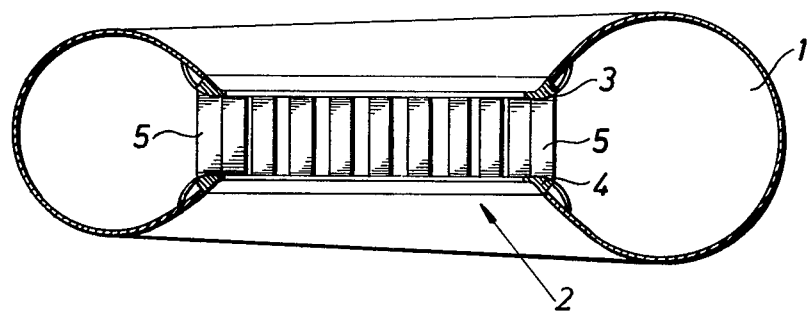
FIG. 1 is an axial cross-sectional view in schematic form of a spiral casing provided with a stay ring according to the invention.

FIG. 1 shows schematically a spiral casing 1 for a hydraulic turbine, pump turbine or pump. This sprial casing consists typically of a number of curved sections of metal plate welded to each other. The ends of each of the sections of the spiral casing are joined to a stay ring 2 which is coaxial relative to the machine axis and is located radially outwardly of the guide vane ring (not shown). The stay ring 2 consists of two axially-spaced ring members 3 and 4, disposed coaxially relative to the machine axis, and a number of axially extending stay vanes 5, interconnected between the two ring members. The stay vanes 5 are oblique to radial-axial planes in correspondence to the direction of fluid flow through the stay ring to the guide vanes. The ends of the sections of the spiral casing 1 are welded to the upper ring member 3 and the lower ring member 4, respectively, along the circumference of the ring members.

The two ring members 3 and 4 of the stay ring are in all material respects the same, wherefore the following description of the construction of the upper ring member 3 is equally applicable to the lower ring member.

Figure 2:
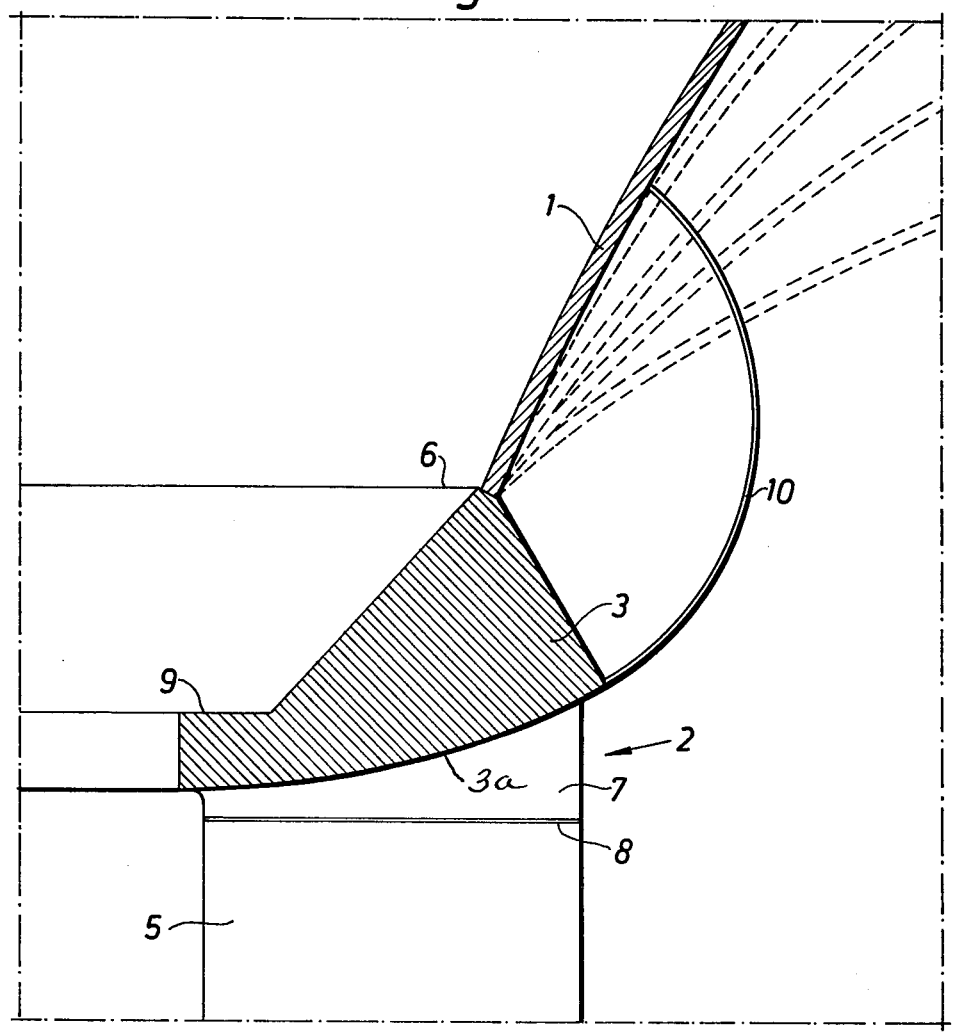
FIG. 2 is a cross-sectional view, on a larger scale, of the upper part of the stay ring shown in FIG. 1.

As can be most readily seen in FIG. 2, each of the ring members 3, 4 of the stay ring according to the invention is a cast member, has a substantially triangular cross section and is disposed with one wall 3a facing the other ring member and the stay vanes 5 interconnected therebetween. The ends of the sections of the spiral casing 1 are welded to the ring member 3 along the annular edge 6 of the ring member corresponding to the vertex of the triangular cross section of the ring member opposite the aforementioned wall 3a. The wall 3a may, as shown in FIG. 2, be somewhat convex to provide smooth fluid flow adjacent to it through the stay ring, but this is not an essential requisite for the stay ring according to the invention. The stay vanes 5 are connected to the wall 3a, preferably by way of welding them along welds 8 to axially projecting stubs 7 on the wall 3a which are cast integrally with the other portions of the ring member 3 and which have the same cross section and orientation as the stay vanes. The ends of the stay vanes 5 may also be welded directly to the wall 3a of the ring member 3.

The triangular cross section of the ring member 3 provides a large bending stiffness, in spite of its relatively small cross-sectional area, and therefore low material cost and low weight. The triangular cross section of the ring member 3 also makes it possible in a very advantageous way for the tensile stresses imposed upon the ring member 3 from the sections of the spiral casing 1 to be directed substantially through the center of gravity of the cross section of the ring member and for the axial components of these forces to be, in turn, transferred to the stay vanes 5 with a very uniform distribution over the entire cross section of the stay vanes. Due to this uniform stress on the stay vanes, the material is utilized more efficiently, whereby it is possible to reduce the lengths of the stay vanes in the direction of flow and thus to make the entire stay ring thinner in the radial direction.

The internal diameter of the spiral casing 1 varies along the circumference of the stay ring, wherefore the metal plate sections of the spiral casing 1 join the ring member 3 at angles that vary along the circumference of the stay ring, as indicated by dotted lines in FIG. 2. This can be taken into account by modifications of the cross section of the cast ring member 3 along its circumference, particularly at and close to the annular edge 6 along which the sheet metal sections of the spiral casing 1 are welded.

In the embodiment shown in FIG. 2, the radially inner rim of the ring member 3 is provided with an annular support and mounting surface 9 for connection to the guide vane ring located inside of the stay ring or to a turbine cover or a foundation. For turbines in which the forces imposed upon the stay ring from the guide vane ring or the turbine cover are large, it may be preferable to locate the support and mounting surface 9 for the guide vane ring or the turbine cover farther outwardly than the location shown in FIG. 2 and thus closer to the centers of gravity of the ring member 3 and the stay vanes 5.

A thin metal flow guide 10, the only object of which is to improve the fluid flow to the stay ring and which is of no importance to the structural strength of the stay ring, may be provided. Such a guide 10 should have openings so that the hydrostatic pressure is equalized on opposite sides thereof.

Figure 3:
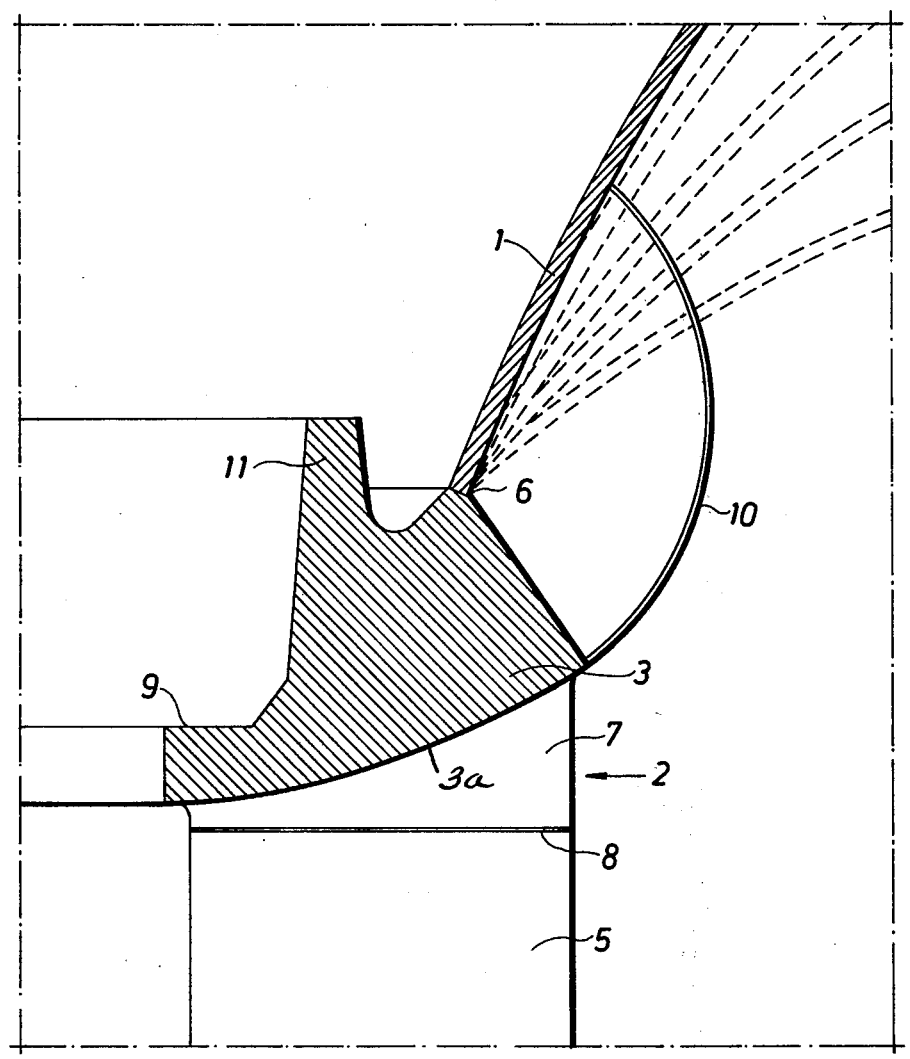
FIG. 3 is a cross-sectional view, similar to the one in FIG. 2, of a somewhat modified embodiment according to the invention.

In order further to increase the bending stiffness of the ring members in the axial direction, a somewhat modified design of the ring members may be used, as illustrated by way of example in FIG. 3. The ring member 3 shown in FIG. 3 is fundamentally of the same design as the ring member shown in FIG. 2 and described above, but on its outer side surface between the annular edge 6 joined to the spiral casing 1 and the radially inner rim, it is provided with a stiffening or reinforcement rib 11. In this way, without any changes in other characteristics of the ring member 3, the stiffness or rigidity of the ring member to bending in the axial direction is increased. As a consequence, the circumferential spacing between the stay vanes 5 can also be increased so that the total number of stay vanes in the stay ring is reduced.

It should be noted that, as well known from prior art stay rings, the stay ring according to the invention may, particularly when of a large diameter, be manufactured in a number of separate peripheral sections, each being an arc of a circle, which are joined to each other, e.g. by means of bolts, at the site of installation to form the complete stay ring.

We claim:

1. In a rotary hydraulic machine having a spiral casing of the type that is built up of metal plates, a stay ring comprising two ring members disposed coaxially about the machine axis and spaced from each other axially of the machine, and axially extending stay vanes connected between said ring members, each of the ring members being a cast member of substantially triangular cross section and being disposed with one wall thereof facing the other ring member and the stay vanes therebetween, the axial ends of the stay vanes being welded to said one wall of the ring members, the ends of the metal plates of the spiral casing being welded to the ring members along annular edges of the ring members located opposite to said one wall of the ring members substantially at the intersection between the other two walls of the ring member, said annular edge of each ring member having a diameter intermediate the diameters of the two remaining annular edges of the ring member at the two remaining vertexes of the substantially triangular cross section, and the shape of said triangular cross section of each ring member being such that extensions in radial-axial planes of the axes of the ends of the spiral casing plates pass in close proximity to the centers of gravity of the cross sections of the ring members in said planes.

2. A stay ring as claimed in claim 1, wherein each ring member has an integral annular reinforcement rib on the wall of the ring member that extends between said annular edge and the radially inner edge of the ring member.

3. A stay ring as claimed in claim 1, wherein each ring member has integral stubs extending axially from said one wall, the stubs having transverse cross sections corresponding to the cross sections of the stay vanes and wherein the axial ends of the stay vanes are welded to the axial ends of the stubs.

4. A stay ring as claimed in claim 1, wherein said one wall of each ring member is convex in agreement with the fluid flow through the stay ring.

5. A stay ring as claimed in claim 1, wherein each ring member has an annular support surface adapted to engage an adjacent component of a rotary hydraulic machine installation.

* * * * *